(12) United States Patent
Itou

(10) Patent No.: US 6,758,788 B2
(45) Date of Patent: Jul. 6, 2004

(54) VEHICLE CONTROL APPARATUS AND VEHICLE CONTROL METHOD

(75) Inventor: Yoshio Itou, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/080,711

(22) Filed: Feb. 25, 2002

(65) Prior Publication Data

US 2002/0117338 A1 Aug. 29, 2002

(30) Foreign Application Priority Data

Feb. 28, 2001 (JP) ............................................ 2001-055501

(51) Int. Cl.$^7$ ............................ H02P 15/00; H02P 15/02
(52) U.S. Cl. ............................................. 477/8; 477/11
(58) Field of Search ........................... 477/8, 11, 173, 477/178

(56) References Cited

U.S. PATENT DOCUMENTS

| | | | | |
|---|---|---|---|---|
| 6,453,865 B2 * | 9/2002 | Hirose et al. | ............ | 123/179.4 |
| 6,464,028 B1 * | 10/2002 | Imani | ............ | 180/65.2 |
| 6,474,294 B2 * | 11/2002 | Yamazaki et al. | ............ | 123/295 |
| 6,504,259 B1 * | 1/2003 | Kuroda et al. | ............ | 290/40 C |
| 6,532,926 B1 * | 3/2003 | Kuroda et al. | ............ | 123/179.4 |

FOREIGN PATENT DOCUMENTS

| | | |
|---|---|---|
| JP | A 9-310629 | 12/1997 |
| JP | A 2000-179373 | 6/2000 |
| JP | A-2001-47890 | 2/2001 |

* cited by examiner

Primary Examiner—Tisha D Lewis
(74) Attorney, Agent, or Firm—Oliff & Berridge PLC

(57) ABSTRACT

A vehicle control apparatus and method drives a driven device with power from a drive power source, and performs a control of stopping the drive power source based on a stop request. The load on the drive power source is reduced by controlling the driven device so as to reduce the load on the drive power source if the stop request has been output and a system that controls the rotating of the drive power source is in a state where the system is not allowed to stop the drive power source.

17 Claims, 5 Drawing Sheets

FIG. 4

|        | C0 | C1 | C2 | B0 | B1 | B2 | B3 | B4 | F0 | F1 | F2 |
|--------|----|----|----|----|----|----|----|----|----|----|----|
| P      | O  |    |    |    |    |    |    |    |    |    |    |
| R (DURING STOP) | O  |    | O  |    |    |    |    | O  |    |    |    |
| R (DURING RUN)  |    |    | O  | O  |    |    |    | O  |    |    |    |
| N      | O  | O  |    |    |    |    |    |    | O  |    |    |
| 1st    | O  | O  |    |    |    |    |    | ◎  | O  |    |    |
| 2nd    | ◎  | O  |    |    |    |    | O  |    | O  |    |    |
| 3rd    | O  | O  |    |    | ◎  | O  |    |    | O  |    | O  |
| 4th    | O  | O  | O  |    |    | △  |    |    | O  | O  |    |
| 5th    |    | O  | O  | O  |    | △  |    |    |    |    |    |

VEHICLE CONTROL APPARATUS AND VEHICLE CONTROL METHOD

INCORPORATION BY REFERENCE

The disclosure of Japanese Patent Application No. 2001-055501 filed on Feb. 28, 2001, including the specification, drawings and abstract is incorporated herein by reference in its entirety.

BACKGROUND OF THE INVENTION

1. Field of Invention

The invention relates to vehicle control apparatus and methods for controlling the rotating and stopping of a drive power source based on a predetermined condition.

2. Description of Related Art

Known vehicle control apparatus stop an engine regardless of operation of an ignition key if a stop condition is met, for the purposes of improving fuel economy, reducing emission gasses, reducing noise, etc. An example of such an apparatus is described in Japanese Patent Application Laid-Open No. 9-310639. A vehicle control apparatus described in that publication is designed for vehicles in which a hydraulically controlled or electrically controlled torque converter is connected to an output side of an engine. Examples of the condition for stopping the engine include the actuation of a parking brake, the duration of a stop of the vehicle based on an event that a door is opened by a passenger, and the like. Examples of the condition for starting the engine include the release of the parking brake, the closing of a door accomplished by a passenger, and the like.

In the vehicle control apparatus described in the aforementioned publication, however, even when the condition for stopping the engine is met during a stop of the vehicle, it is not preferable that the engine is be stopped if another condition is met, for example, if there is a request to actuate an air-conditioner compressor that is driven by power from the engine. The torque converter is an apparatus that transfers power between a driving-side rotating member and a driven-side rotating member based on kinetic energy of a fluid. The driven-side rotating member of the torque converter remains stopped during a stopped state of the vehicle. Therefore, if the engine cannot be stopped even though the engine stopping condition is met, a state in which the driving-side rotating member and the driven-side rotating member turn relative to each other is maintained. Therefore, the fluid in the torque converter is agitated, so that a generally-termed dragging torque occurs. As a result, the engine load increases, and the fuel consumption increases.

SUMMARY OF THE INVENTION

It is an object of the invention to curb the increase in the load on a drive power source if the drive power source cannot be stopped despite output of a request to stop the drive power source.

A first aspect of the invention relates to a vehicle control apparatus which includes a driven device that is driven by power from a drive power source, a system that controls rotating and stopping of the drive power source based on a predetermined condition, a detector that detects a request to stop the drive power source, and a controller that determines that the system is in a state where the system is not allowed to stop the drive power source, and that controls the driven device so as to reduce a load on the drive power source. The controller controls the driven device so as to reduce the load on the drive power source, if the detector detects the request to stop the drive power source and the controller determines that the system is in the state where the system is not allowed to stop the drive power source.

According to the first aspect of the invention, if the system is in the state that is not appropriate for execution of the control of stopping the drive power source despite output of the request to stop the drive power source, the driven device is controlled so as to reduce the load on the drive power source.

A second aspect of the invention relates to a vehicle control method for a vehicle having a drive power source and a driven device that is driven by power transferred from the drive power source. This control method includes a step of detecting a request to stop the drive power source, a step of determining that a system is in a state where the drive power source is not allowed to be stopped, and a step of controlling the driven device so as to reduce a load on the drive power source if the request to stop the drive power source is detected and it is determined that the system is in the state where the drive power source is not allowed to be stopped.

According to the second aspect of the invention, if the system is in the state that is not appropriate for execution of the control of stopping the drive power source despite output of the request to stop the drive power source, the driven device is controlled so as to reduce the load on the drive power source.

A third aspect of the invention relates to a vehicle control apparatus which includes a driven device that is driven by power from a drive power source, a system that controls rotating and stopping of the drive power source based on a predetermined condition, a detector that detects a request to stop the drive power source, and a controller that determines that the system is in a state where the system is allowed to stop the drive power source, and that controls the driven device so as to reduce a load on the drive power source. The controller controls the driven device so as to reduce the load on the drive power source, if the detector detects the request to stop the drive power source and the controller determines that the system is not in the state where the system is allowed to stop the drive power source.

A fourth aspect of the invention relates to a vehicle control method for a vehicle having a drive power source and a driven device that is driven by power transferred from the drive power source. This control method includes a step of detecting a request to stop the drive power source, a step of determining that a system is in a state where the drive power source is allowed to be stopped, and a step of controlling the driven device so as to reduce a load on the drive power source if the request to stop the drive power source is detected and it is determined that the system is not in the state where the drive power source is allowed to be stopped.

BRIEF DESCRIPTION OF THE DRAWINGS

The foregoing and further objects, features and advantages of the invention will become apparent from the following description of preferred embodiments with reference to the accompanying drawings, in which like numerals are used to represent like elements and wherein:

FIG. 4 is a table showing states of operation of friction engagement devices of a transmission indicated in FIG. 3.

DETAILED DESCRIPTION OF PREFERRED EMBODIMENTS

Figure 2:
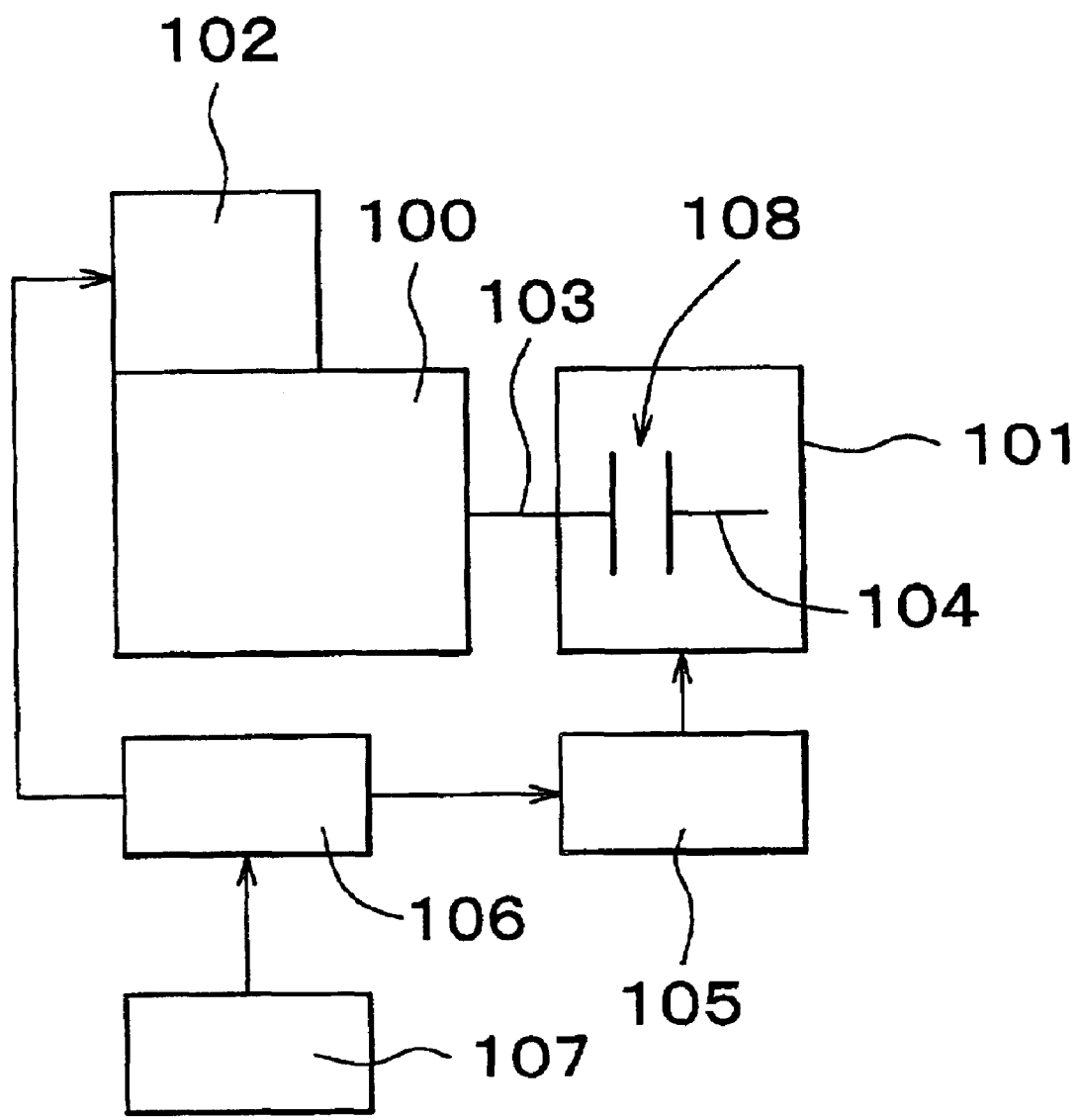
FIG. 2 is a schematic drawing of a vehicle control apparatus for illustrating a principle of the invention.

A basic principle of the invention will first be described with reference to FIG. 2. A driven device 101 is connected to an output side of a drive power source 100 of a vehicle. The drive power source 100 may be at least one of an engine that outputs motive power through combustion of a fuel and an electric motor that outputs motive power using supplied electric power. The engine may be an internal combustion engine, more specifically, a gasoline engine, a diesel engine, an LPG engine, etc. The electric motor may be a motor that has a powering function of converting electric energy into kinetic energy (motive power), or a motor that has a regeneration function of converting kinetic energy (motive power) into electric energy in addition to the powering function. Such engines and motors may be provided in hybrid-electric vehicles, for example.

A drive power source control apparatus 102 is provided for controlling the rotating and stopping of the drive power source 100. The rotating of the drive power source 100 includes start-up, operation (the operation does not include stopping), output, etc. If an engine is employed as the drive power source 100, the drive power source control apparatus 102 may include a fuel injection device, an ignition device, a starter motor, etc. If an electric motor is employed as the drive power source 100, the drive power source control apparatus 102 may include an electricity storage device, such as a battery, a capacitor, etc., as well as an inverter that supplies electric power from the electric storage device to the electric motor, or the like.

The driven device 101 has a first rotating member 103 to which motive power (in other words, torque) of the drive power source 100 is transferred, a second rotating member 104 to which motive power of the first rotating member 103 is transferred, and a clutch 108 that controls the state of power transfer between the first rotating member 103 and the second rotating member 104.

The clutch 108 may be a friction-type clutch, a synchronous mesh-type clutch, a fluid-type clutch, and the like. If the clutch 108 is a friction-type clutch, it is possible to selectively control friction members to one of an engaged state, a released state and a slipping state. On the basis of the engaging pressure of the friction members, the torque capacity thereof is controlled. If the clutch 108 is the fluid-type clutch, the torque capacity changes upon engagement and release of the clutch. As a fluid-type clutch, it is possible to use a generally-termed torque converter that can control the torque ratio between the first rotating member 103 and the second rotating member 104. If the clutch 108 is a torque converter, the clutch 108 has a characteristic that the change gear ratio between the first rotating member and the second rotating member and the torque capacity change in a predetermined relationship. Therefore, employment of a known variable capacity torque converter as the torque converter makes it possible to control the torque capacity of the torque converter.

Examples of the driven device 101 include a power transfer device that has a function of transferring motive power from the drive power source 100 to wheels and an accessory device that does not have a function of transferring motive power from the drive power source 100 to the wheels. Examples of the power transfer device include a transmission. Examples of the transmission include a stepwise speed transmission capable of varying the change gear ratio between the first rotating member 103 and the second rotating member 104 stepwise and discretely, or a continuously variable transmission capable of steplessly or continuously varying the change gear ratio between the first rotating member 103 and the second rotating member 104. Furthermore, examples of the transmission include a manual transmission that allows the change gear ratio between the first rotating member 103 and the second rotating member 104 to be varied upon operation performed by a driving person, and an automatic transmission that can be automatically controlled based on a condition other than operation performed by a driving person. Examples of the transmission include a selective gear type transmission, a planetary gear type transmission, a belt type continuously variable transmission that has a plurality of pulleys and a belt disposed around the pulleys, and a toroidal type continuously variable transmission having an input disc, an output disc, and power rollers. Examples of the accessory device include an electric power generator that is driven by motive power from the drive power source 100 so as to output electric energy, a power steering oil pump for controlling the operation force needed for operation of a steering device, an air-conditioner compressor, etc.

Furthermore, an actuator 105 is provided for controlling the clutch 108 of the driven device 101. Examples of the actuator 105 include a hydraulic actuator, a pneumatic actuator, an electromagnetic actuator, etc. An electronic control unit (ECU or controller) 106 is provided for controlling the drive power source control apparatus 102 and the actuator 105. Signals from various sensors 107 are input to the electronic control unit 106. In a power train indicated in FIG. 2, the drive power source control apparatus 102 and the actuator 105 are controlled based on the signals input to the electronic control unit 106 and data pre-stored in the electronic control unit 106.

If the drive power source 100 cannot be stopped due to there is a request for operating the drive power source 100 from a system other than an economy run system (corresponding to a second stop condition in an embodiment described below) even though a request for a stop of the drive power source 100 is output, the load on the drive power source 100 is reduced by reducing the torque capacity of the clutch 108 of the driven device 101. However, when there is a request for driving the vehicle by utilizing driving force from the drive power source 100, the torque capacity of the clutch 108 is not reduced. This control curbs the increase in the consumption of fuel if the drive power source 100 is an engine, and curbs the increase in the consumption of electric power if the drive power source 100 is an electric motor.

Figure 3:
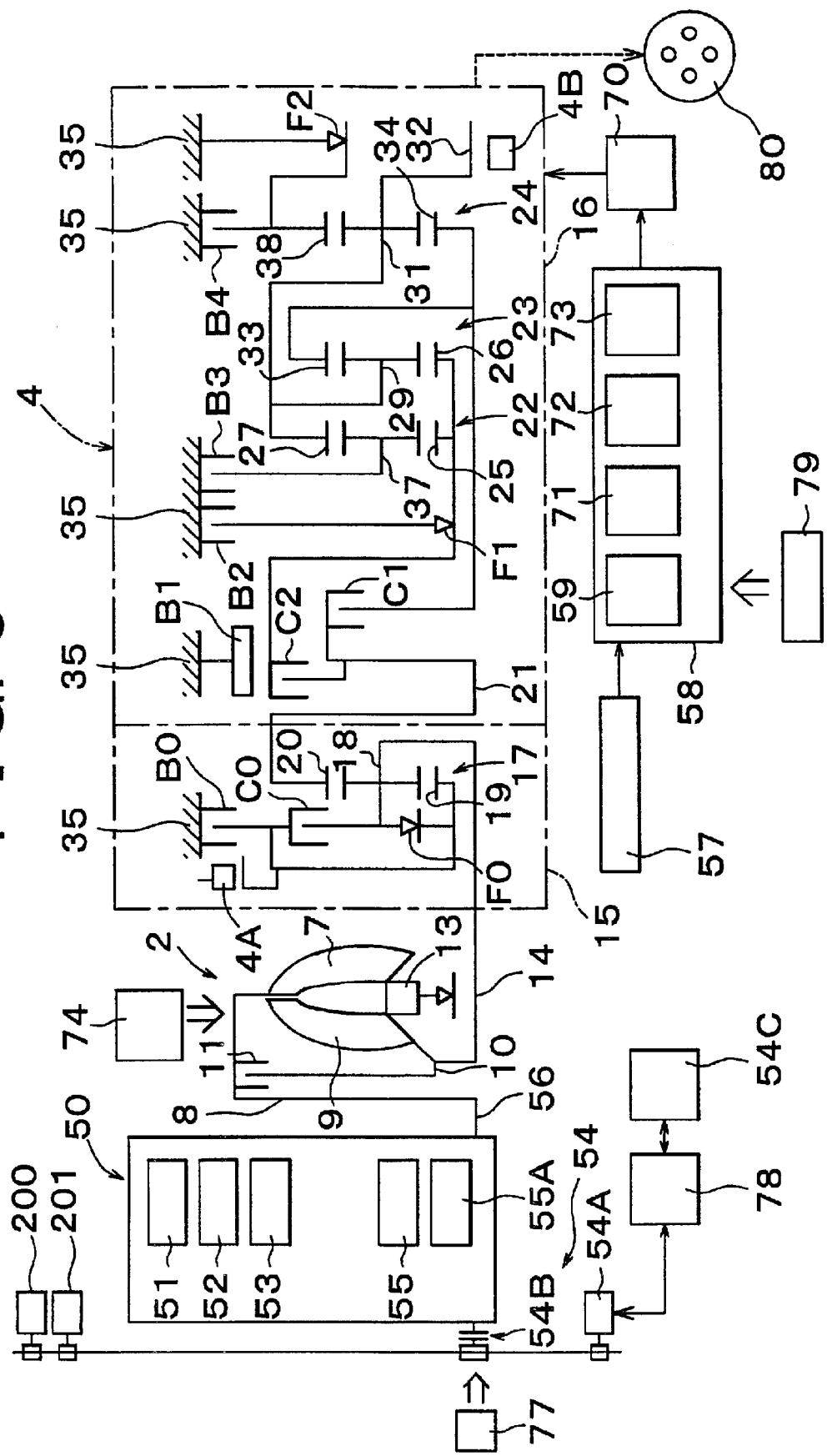
FIG. 3 is a skeleton diagram illustrating an embodiment in which the invention is applied to a power train control apparatus of a vehicle.

An embodiment of the invention will now be described in detail with reference to the drawings. Referring to FIG. 3, an engine 50 provided as a drive power source of the vehicle is a known type of engine that has a fuel injection device 51, an ignition device 52, a cooling device 53, a startup device (starter motor) 55, an intake device 55A, etc. The startup device 55 causes the initial turning (i.e., the cranking) of the engine 50 in a stage preceding an autonomous operation state of the engine 50. The fuel injection device 51 is a device that injects fuel to be supplied into the combustion chambers of the engine 50. The ignition device 52 is a device that ignites fuel-air mixture. That is, the fuel injection device 51 and the ignition device 52 are provided for autonomous operation of the engine 50 following the initial turning of the engine 50.

The cooling device 53 is a device for cooling the engine 50 through the use of cooling water, e.g. The cooling device 53 has a cooling fan (not shown) that is driven by motive power from a crankshaft 56 of the engine 50. An electric device 54 is a device for supplying electric power to the ignition device 52, the startup device 55, illumination devices (not shown), etc. In addition to the electric device 54, there are provided a power steering oil pump 200 and an air-conditioner compressor 201. A power transfer path between the engine 50 and accessory devices that include the electric device 54, the power steering oil pump 200, the air-conditioner compressor 201, etc. is provided with a clutch 54B that connects and disconnects the power transfer path. The electric device 54 has a motor-generator 54A, and an electricity storage device 54C connected to the motor-generator 54A via an inverter 78. The electricity storage device 54C may be a battery, a capacitor, etc. The motor-generator 54A has both a function (powering function) as an electric motor that outputs motive power using supplied electric power, and a function (regeneration function) as a generator that converts mechanical energy into electric power.

If the clutch 54B is engaged and the engine 50 is in operation, a portion of the motive power of the engine 50 can be transferred to the power steering oil pump 200, the air-conditioner compressor 201 and the motor-generator 54A so as to drive these accessory devices. Therefore, using motive power from the engine 50, the motor-generator 54A generates electric power, which can be stored into the electricity storage device 54C. When the engine 50 is in a stopped state, electric power can be supplied from the electricity storage device 54C to the motor-generator 54A via the inverter 78 so as to drive the motor-generator generator 54A as an electric motor. It is also possible to drive the air-conditioner compressor 201 using motive power generated by the driving of the motor-generator 54A.

A torque converter 2 and a transmission 4 are disposed in line in the transfer path of torque output from the engine 50. The torque converter 2 is a kind of a fluidic torque transfer device, and has a torque amplifying function. The torque converter 2 is a device that transfers motive power of a driving-side rotating member to a driven-side rotating member using kinetic energy of the fluid. The torque converter 2 has a front cover 8 that is integrated with a pump impeller 7, a hub 10 to which a turbine runner 9 is firmly attached, and a lockup clutch 11. The front cover 8 is connected to the crankshaft 56. A casing that forms an outer shell of the torque converter 2 contains therein an oil as a working fluid in a sealed state. The lockup clutch 11 is designed so that the lockup clutch 11 can be selectively engaged and released, and also can be caused to slip.

When motive power is being transferred from the engine 50 to the front cover 8 and the lockup clutch 11 has been released, power transfer occurs between the pump impellor 7 and the turbine runner 9 due to kinetic energy of the oil. When the lockup clutch 11 is engaged, the friction force caused thereby causes power transfer between the front cover 8 and the hub 10. When the lockup clutch 11 is slipping, power is transferred between the front cover 8 and the hub 10 due to kinetic energy of the oil and friction force of the lockup clutch 11.

A stator 13 is provided at an inner peripheral side of the pump impellor 7 and the turbine runner 9. The stator 13 is provided for amplifying the torque transferred from the pump impellor 7 to the turbine runner 9. An input shaft 14 is connected to the hub 10. Therefore, when torque is output from the crankshaft 56 of the engine 50, the torque is transferred to the input shaft 14 via the torque converter 2 or the hub 10.

The transmission 4 is made up of a subsidiary transmission section 15 and a main transmission section 16. The subsidiary transmission section 15 has a planetary gear mechanism 17 for overdrive. The input shaft 14 is connected to a carrier 18 of the planetary gear mechanism 17. A multi-disc clutch C0 and a one-way clutch F0 are provided between the carrier 18 and a sun gear 19 of the planetary gear mechanism 17. The one-way clutch F0 is designed so as to engage when the sun gear 19 turns forward relative to the carrier 18 (i.e., turns in the rotating direction of the input shaft 14). A ring gear 20 of the subsidiary transmission section 15, that is, an output element thereof, is connected to an intermediate shaft 21 of the main transmission section 16, that is, an input element thereof. A multi-disc brake B0 is provided for selectively stopping the turning of the sun gear 19.

Therefore, in the subsidiary transmission section 15, when the multi-disc clutch C0 or the one-way clutch F0 is engaged, the entire planetary gear mechanism 17 rotates as one unit. Hence, the intermediate shaft 21 and the input shaft 14 rotate at equal speeds. That is, in this case, the gear speed stage of the subsidiary transmission section 15 is a low speed stage. When the multi-disc brake B0 is engaged so that the sun gear 19 does not rotate, the ring gear 20 rotates forward at an increased speed relative to the input shaft 14. That is, in this case, the gear speed stage of the subsidiary transmission section 15 is a high speed stage.

The main transmission section 16 has three sets of planetary gear mechanisms 22, 23, 24. Rotating elements of the three sets of planetary gear mechanisms 22, 23, 24 are connected as described below. That is, a sun gear 25 of a first planetary gear mechanism 22 and a sun gear 26 of a second planetary gear mechanism 23 are firmly interconnected. A ring gear 27 of the first planetary gear mechanism 22, a carrier 29 of the second planetary gear mechanism 23, and a carrier 31 of a third planetary gear mechanism 24 are connected. The carrier 31 is connected to an output shaft 32. The output shaft 32 is connected to a wheel 80. A ring gear 33 of the second planetary gear mechanism 23 is connected to a sun gear 34 of the third planetary gear mechanism 24.

In the gear train of the main transmission section 16, one reverse speed stage and four forward speed stages can be set. A friction engagement device for setting these speed stages, that is, clutches and brakes, is provided as follows. First, the clutches will be described. A first clutch C1 is provided between the intermediate shaft 21 and the ring gear 33, as well as the sun gear 34. A second clutch C2 is provided between the intermediate shaft 21 and the sun gear 25, as well as the sun gear 26 integrally connected to the sun gear 25.

The brakes will next be described. A first brake B1 that is a band brake is disposed so as to stop rotation of the sun gear 25 of the first planetary gear mechanism 22 and rotation of the sun gear 26 of the second planetary gear mechanism 23. A first one-way clutch F1 and a second brake B2 that is a multi-disc brake are disposed in line between the sun gears 25, 26 and a casing 35 of the transmission. The first one-way clutch F1 is designed to engage when the sun gears 25, 26 are to reversely turn (i.e., turn in the direction opposite to the rotating direction of the input shaft 14).

A third brake B3 that is a multi-disc brake is provided between the casing 35 and the carrier 37 of the first planetary gear mechanism 22. The third planetary gear mechanism 24 has a ring gear 38. A fourth brake B4 that is a multi-disc brake, and a second one-way clutch F2 are provided as brakes for stopping rotation of the ring gear 38. The fourth brake B4 and the second one-way clutch F2 are disposed in parallel to each other between the casing 35 and the ring gear 38. The second one-way clutch F2 is designed so as to engage when the ring gear 38 is to reversely turn. Furthermore, an input rotation speed sensor (turbine rotation speed sensor) 4A for detecting the input rotation speed of the transmission 4, and an output shaft rotation speed sensor (vehicle speed sensor) 4B for detecting the rotation speed of the output shaft 32 of the transmission 4 are provided. Thus, in the power train illustrated in FIG. 3, motive power of the engine 50 is input to the transmission 4 via the torque converter 2.

Corresponding to the friction engagement devices, such as the brakes and the clutches other than the one-way clutches, and the like, a hydraulic servo mechanism is formed by a plurality of oil pressure chambers 70, return springs, etc. The hydraulic servo mechanism is designed so as to control the engaged state, the released state and the slipping state of the friction engagement devices, and the engaging pressures thereof, etc., by controlling the oil pressures that act in the oil pressure chambers 70.

A hydraulic control device 58 is provided for controlling the transmission 4 and the lockup clutch 11. The hydraulic control device 58 has a function that controls the lockup clutch 11 and the friction engagement devices other than the one-way clutch by the oil pressure. The hydraulic control device 58 has a manual valve 59, a plurality of shift valves 71, a plurality of shift solenoids 72, and a lockup solenoid valve 73. The manual valve 59 is controlled by an actuator 79 based on operation of a shift device 57 or a condition other than operation of the shift device 57. The shift valves 71 are disposed in oil passages connecting output ports of the manual valve 59 and the oil pressure chambers 70 of the friction engagement devices. The shift solenoids 72 control operation of the shift valves 71. The lockup solenoid valve 73 controls the lockup clutch 11.

A line pressure obtained by adjusting the ejected oil pressure of an oil pump (not shown) to a predetermined oil pressure is input to an input port of the manual valve 59.

An actuator 74 is provided for controlling the torque capacity of the torque converter 2. The torque capacity of the torque converter 2 can be adjusted through adjustment of the angle of blades (not shown) of the pump impellor 7 and the turbine runner 9 using the actuator 74.

In the transmission 4 constructed as described above, five forward speeds and one reverse speed can be set by engaging and releasing the friction engagement devices, such as the clutches, the brakes, etc., as indicated in an operation table shown in FIG. 4. In FIG. 4, symbol ○ indicates that a friction engagement device is engaged. Furthermore, symbol ⊚ indicates that a friction engagement device is engaged at the time of engine brake, and symbol Δ indicates that a friction engagement device may be engaged or released, that is, indicates that the friction engagement device is irrelevant to torque transfer even if the friction engagement device is engaged. Each blank indicates that a friction engagement device is in the released state.

The hydraulic control device 58 operates based on a signal output from an electronic control unit (ECU) 60 while a predetermined shift position is selected by the shift device 57. Each speed stage of the transmission 4 is set by suitably engaging and releasing the friction engagement devices according to the operation of the hydraulic control device 58. Due to operation of the shift device 57, it is possible to select, for example, a parking (P) position for maintaining the stopped state of the vehicle, a reverse (R) position for reverse driving of the vehicle, a neutral (N) position, a drive (D) position, a 4th position, a 3rd position, a 2nd position, and a low (L) position. Among these positions, the forward driving positions are the drive position, the 4th position, the 3rd position, the 2nd position and the low position. When the shift position is changed by operating the shift device 57, the manual valve 59 is actuated to change oil passages.

When the shift position is the drive position, a speed stage can be selected within the range of the first forward speed to the fifth forward speed. When the shift position is the 4th position, a speed shift can be selected within the range of the first forward speed to the fourth forward speed. When the shift position is the 3rd position, a speed shift can be selected within the range of the first forward speed to the third forward speed. When the shift position is the 2nd position, the first forward speed or the second forward speed can be selected. When the shift position is the L position, the speed stage is fixed at the first forward speed.

When any one of the forward driving positions is selected through operation of the shift device 57, the first clutch C1 is engaged regardless of which one of the forward driving positions is selected. The engagement of the first clutch C1 enables power transfer between the input shaft 14 and the output shaft 32. In contrast, when the P position or the N position is selected through operation of the shift device 57, the first clutch C1 is released, so that power transfer between the input shaft 14 and the output shaft 32 becomes impossible.

Figure 5:
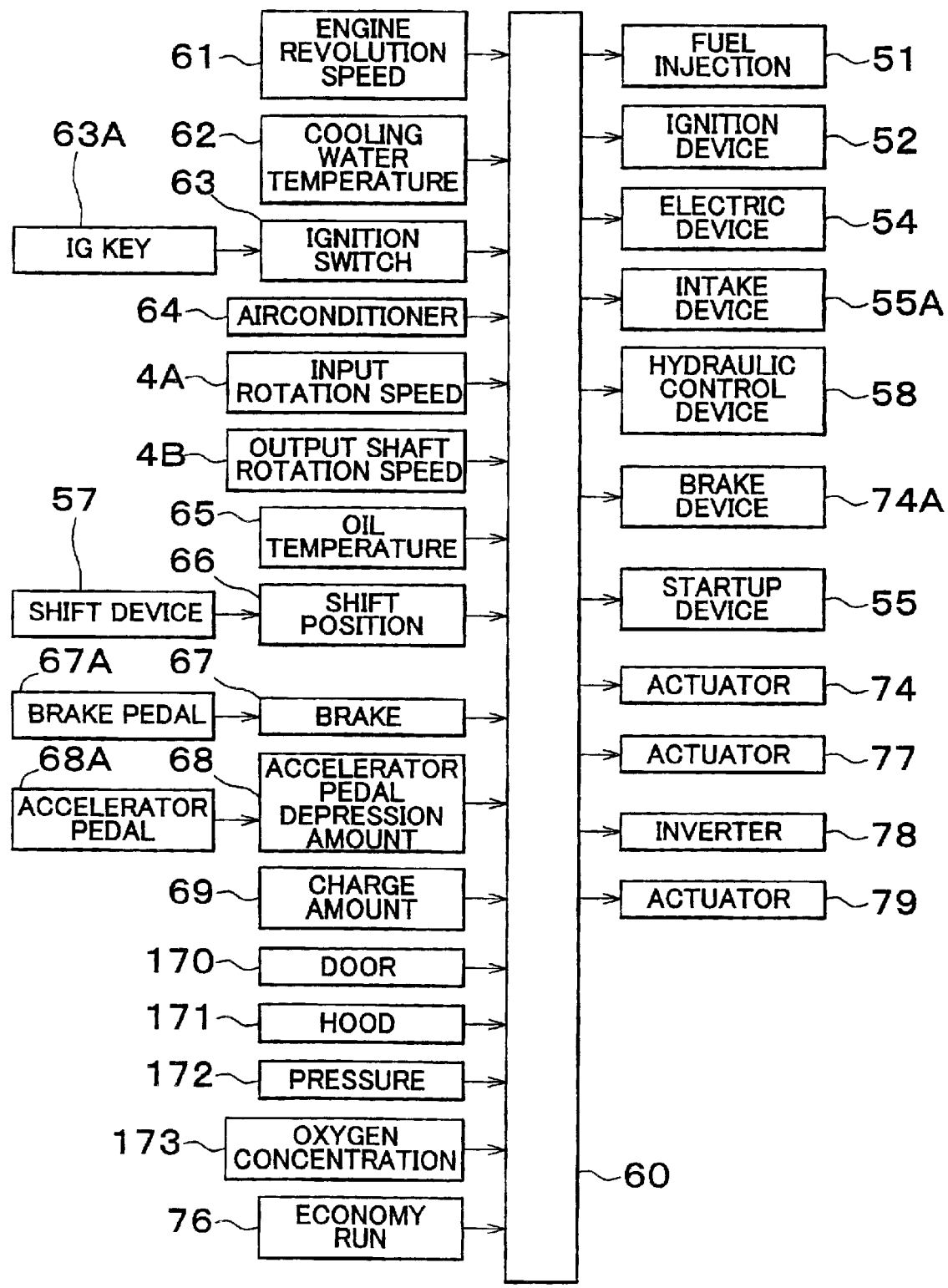
FIG. 5 is a block diagram illustrating a control circuit for the entire vehicle indicated in FIG. 3.

FIG. 5 is a block diagram indicating a control circuit of the vehicle in this embodiment. The electronic control unit (ECU) 60 includes an engine electronic control unit (not shown) for controlling the engine 50, a transmission electronic control unit (not shown) for controlling the transmission 4 and the hydraulic control device 58, an economy-run electronic control unit (not shown) for rotating and stopping the engine 50 based on a below-described predetermined condition, and an overall control unit (not shown) for overall control of the control units. Each of the overall control unit, the engine electronic control unit, the transmission electronic control unit, and the economic-run electronic control unit is formed by a microcomputer that has a central processing unit (CPU or MPU), storage devices (RAM, ROM) and input/output interfaces. An arrangement is made such that signals can be transmitted and received among the overall control unit, the engine electronic control unit, the transmission electronic control unit, and the economy-run electronic control unit.

The signals input to the electronic control unit (ECU) 60 include a signal from an engine revolution speed sensor 61, a signal from a cooling water temperature sensor 62 for detecting the water temperature of the cooling device 53, a signal from an ignition switch 63 for detecting the operation state of an ignition key 63A, a signal from an air-conditioner switch 64, a signal from the input rotation speed sensor 4A, a signal from the output shaft rotation speed sensor 4B for detecting the rotation speed of the output shaft 32, a signal from an oil temperature sensor 65 for detecting the temperature of an oil contained in the oil passage of the hydraulic control device 58, a signal from a shift position sensor 66 for detecting the shift position selected by the shift device 57, a signal from a brake sensor 67 for detecting the operation state of a brake pedal 67A, and a signal from an accelerator pedal depression amount sensor 68 for detecting the amount of depression of an accelerator pedal 68A.

The signals input to the electronic control unit (ECU) 60 further include a signal from a charge amount detecting sensor 69 for detecting the amount of charge stored in the electricity storage device 54C, a signal from a door sensor 170 for detecting the open/closed state of a door, a signal from a hood sensor 171 for detecting the open/closed state of a hood that covers an engine compartment where the engine 50 is installed, a signal from a pressure detecting sensor 172 for detecting the pressure in a negative pressure chamber of a booster (not shown) of a brake device 74A, a signal from an oxygen concentration sensor 173 for detecting the oxygen concentration in exhaust gas from the engine 50, a signal from a main switch 76, etc. The main switch 76 is a switch for starting and discontinuing operation of an economy run system, that is, a system for controlling the revolution and stoppage of the engine 50, based on a condition other than the operation state of the ignition key 63A.

The electronic control unit (ECU) 60 outputs a signal for controlling the ignition device 52, a signal for controlling the fuel injection device 51, a signal for controlling the startup device 55, a signal for controlling the intake device 55A, a signal for controlling the electric device 54, a signal for controlling the hydraulic control device 58, a signal for controlling the oil pressure of a wheel cylinder (not shown) of the brake device 74A, a signal for controlling the actuator 74, a signal for controlling an actuator 77 that controls the state of the clutch 54B, a signal for the inverter 78 that controls the motor-generator 54A, a signal for the actuator 79 that controls the operation of the manual valve 59, etc.

A map for controlling the speed stage of the transmission 4 and the engagement, the release and the slipping of the lockup clutch 11 is pre-stored in the electronic control unit (ECU) 60. On the basis of signals input to the electronic control unit (ECU) 60, the state of running of the vehicle (e.g., the vehicle speed and the amount of accelerator pedal depression) is detected. On the basis of a result of the detection and the aforementioned map, the electronic control unit (ECU) 60 determines a speed stage to be set by the transmission 4, and the content of control of the lockup clutch 11. A control signal based on a result of the determination is transmitted from the electronic control unit (ECU) 60 to the hydraulic control device 58 so as to control the speed stage of the transmission 4 and the state of the lockup clutch 11. That is, the transmission 4 is a generally-termed automatic transmission in which the change gear ratio is controlled based on the state of run of the vehicle. The aforementioned vehicle speed is calculated based on the signal from the output shaft rotation speed sensor 4B.

The control of the lockup clutch 11 will now be described. For example, if the vehicle runs at or above a predetermined vehicle speed, the lockup clutch 11 is engaged. If the vehicle runs below the predetermined vehicle speed, the lockup clutch 11 is released or is caused to slip. That is, if the vehicle runs at or above the predetermined vehicle speed, the lockup clutch 11 is engaged in order to curb deterioration in fuel economy caused by power loss in the torque converter 2. If the vehicle speed is below the predetermined vehicle speed, combustion in the engine 50 is not stable, and therefore torque fluctuates. Therefore, in order to prevent or reduce transfer of torque fluctuation to the transmission 4, the lockup clutch 11 is released or is caused to slip. That is, the torque fluctuation is absorbed or reduced due to the slip between the pump impellor 7 and the turbine runner 9.

During a stoppage of the vehicle, the lockup clutch 11 is released. In this case, too, power of the engine 50 is transferred from the pump impellor 7 to the turbine runner 9 due to kinetic energy of the oil. However, due to a vehicle running resistance, the vehicle is kept in the stopped state, or moves at a very low speed. Thus, during the stopped state of the vehicle, power of the engine 50 is transferred to the wheel 80 via the transmission 4 and torque converter 2. As a result, there occurs such a drive power that the vehicle is moved at a very low vehicle speed or is kept in the stopped state. This phenomenon is generally termed creep phenomenon.

If the amount of charge of the electricity storage device 54C drops to, or below, a predetermined value, the clutch 54B is engaged to transfer motive power from the engine 50 to the motor-generator 54A, and the inverter 78 is controlled to cause regenerative power generation by the motor-generator 54A. Electric power generated by the regenerative power generation is stored into the electricity storage device 54C. If there is no need to store electric power into the electricity storage device 54C, it is possible to select one of a control of releasing the clutch 54B and a control of preventing regenerative power generation of the motor-generator 54A.

Figure 1:
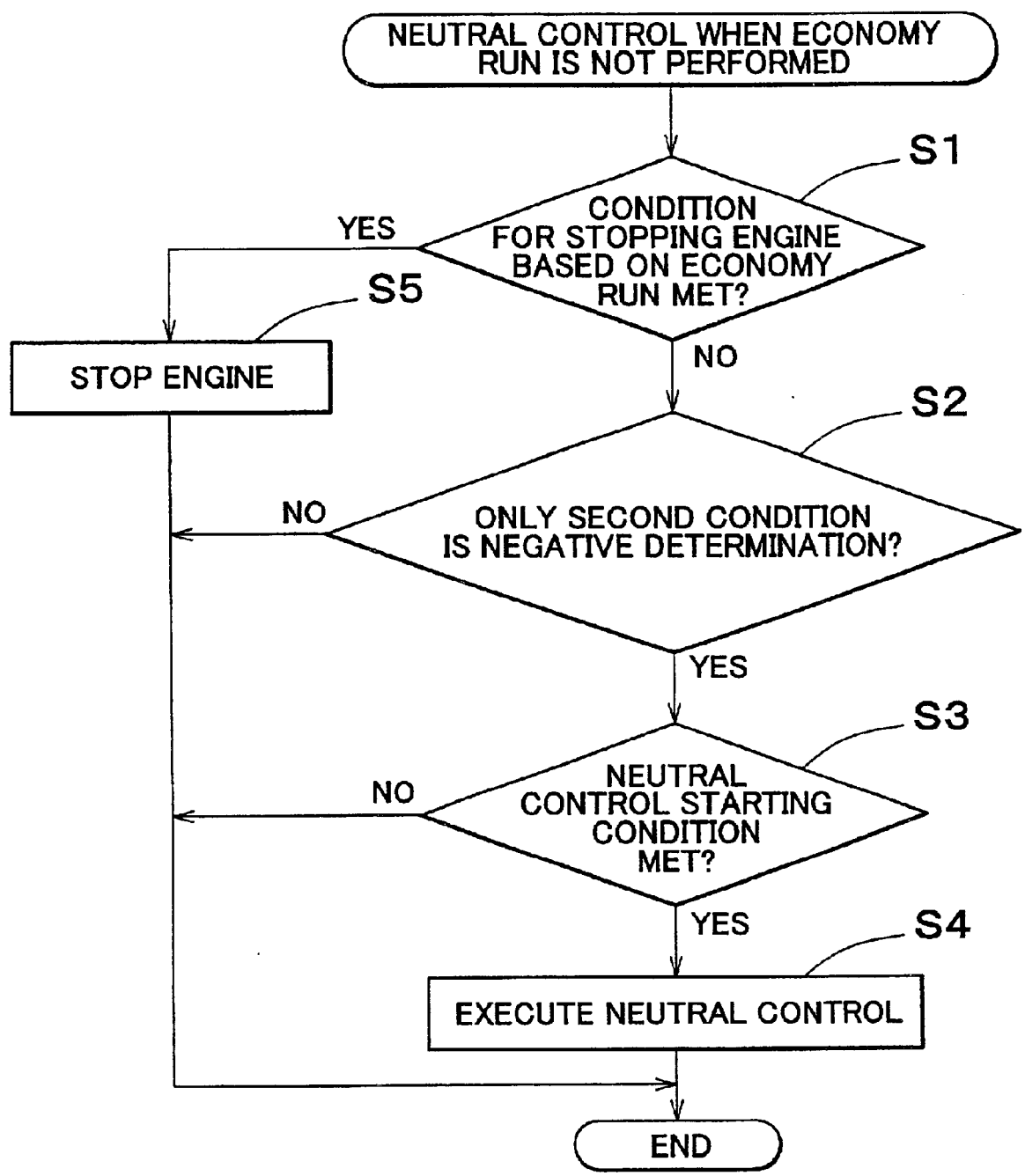
FIG. 1 is a flowchart illustrating an embodiment of the invention.

A control in the first embodiment will next be described with reference to the flowchart of FIG. 1. The flowchart of FIG. 1 illustrates a control performed in relation to the economy run system. First, it is determined whether an overall stop condition for stopping the engine 50 is met (step S1). That is, it is determined whether a condition for stopping the engine 50 based on the economy run system is met. The overall stop condition includes the following first to fourth stop conditions.

The first stop condition is a condition based on a driver's intention to stop the vehicle. The first stop condition is met, for example, if at least one of the following first to third events is detected.

The first event is that after the D position is selected and the vehicle runs at or above a predetermined vehicle speed, the brake pedal 67A is depressed and the vehicle is stopped.

The second event is that the vehicle is stopped and the N position or the P position is selected.

The third event is that the vehicle is stopped and a door or the hood is open.

If the accelerator pedal 68A is depressed, the first stop condition is not met regardless of detection of the first or second event. Whether the vehicle is in the stopped state is determined based on the vehicle speed.

The second stop condition is a condition other than the intention of a driver to stop the vehicle, in the detail, a condition where there is a request for operating the engine 50 from a system other than the economy run system. The second stop condition is met if all the following events are detected. The events include an event that the cooling water temperature is equal to or greater than a predetermined temperature, an event that a control of learning the air-fuel ratio of the engine 50 has been completed, an event that the pressure in the negative pressure chamber of the brake device 74A is at a level that allows a reduction in the operating force needed to depress the brake pedal 67A, an event that the amount of charge of the electricity storage device 54C is equal to or greater than a predetermined value, an event that the air-conditioner load is equal to or less than a predetermined value, etc.

The third stop condition is met if a system involved in the control of rotating and stopping the engine 50 is in a normal state. Examples of a system involved in the control of rotating and stopping the engine 50 include an electric system, a function device that directly controls the rotating and stopping of the engine 50, and a substitute device that outputs motive power as a substitute for the engine 50 during a stoppage of the engine 50. Examples of the electric system include various sensors and switches for detecting the overall stop condition, a communication circuit for transmission and reception of signals among the overall control unit, the engine electronic control unit, the transmission electronic control unit, and the economy-run electronic control unit, etc. Examples of the function device include the ignition device 52, the fuel injection device 51, etc. Examples of the substitute device include the electricity storage device 54C and the inverter 78 for supplying electric power to the motor-generator 54A when the engine 50 is stopped, etc. If it is determined that all the systems as mentioned above are normal, the third stop condition is met.

The fourth stop condition is met when there is no request for driving the vehicle by utilizing driving force from the engine 50. For example, it is determined whether the fourth stop condition is met based on the state of a vehicle stopping system for maintaining a stopped state of the vehicle when the engine 50 is automatically stopped. Examples of the vehicle stopping system include the brake device 74A and the hydraulic control device 58. Whether the fourth stop condition is met may also be determined based on the state of an electronic throttle valve that forms the intake device 55A, or the state of the startup device 55.

If all the first to fourth stop conditions are met, the aforementioned overall stop condition is met, and the affirmative determination is made in step S1. Subsequently in step S5, a control of stopping the engine 50 is executed. After that, this control routine is ended.

That is, if the engine 50 has already been in the stopped state, the stopped state is continued. If the engine 50 is in operation, the engine 50 is automatically stopped. If the affirmative determination is made in step S1, the aforementioned creep phenomenon will not occur, because the engine 50 is automatically stopped in step S1. Therefore, a control of holding the vehicle in the stopped state instead of the creep phenomenon can be performed. As the control of holding the vehicle in the stopped state, it is possible to use a "lock control" of locking rotation of the output shaft 32 of the transmission 4 and a "hill hold control". The hill hold control is a control in which, on the basis of a signal of the electronic control unit (ECU) 60, the oil pressure in the wheel cylinder of the brake device 74A is kept at or above a predetermined value so as to restrict rotation of the wheel 80. The lock control is a control in which one of the various friction engagement devices indicated in FIG. 3 is forcibly engaged based on a signal from the electronic control unit (ECU) 60, so that rotation of the output shaft 32 is restricted and therefore rotation of the wheel 80 is restricted.

If a negative determination is made in step S1, the engine 50 is operated. For example, if the negative determination is made in step S1 during a stop of the engine 50, the engine 50 is started and autonomously operates. In contrast, if the negative determination is made in step S1 during an operation of the engine 50, the operation of the engine 50 is continued. Some reasons for operating the engine 50 if the negative determination is made in step S1 are described below.

If the first stop condition is not met, the engine 50 is operated because a driver has no intention to stop the vehicle or because there is a possibility of moving the vehicle in a short time even if the vehicle is currently stopped. If the second stop condition is not met, the engine 50 is operated for the following reason. That is, if the cooling water temperature is at or below the predetermined temperature, the engine 50 is operated so as to accelerate the warm-up of the engine 50 and reduce emissions. If the pressure in the negative pressure chamber of the brake device 74A decreases to or below a predetermined value, the engine 50 is operated in order to reduce the force needed to operate the brake pedal 67A using the negative pressure of the intake device 55A. Furthermore, the air-fuel ratio of the engine 50 is detected based on a signal from the oxygen concentration sensor 173. Therefore, until the control of learning the air-fuel ratio ends, the engine 50 is operated.

If the amount of charge of the electricity storage device 54C is less than a predetermined value, the engine 50 is operated because motive power from the engine 50 is needed to drive the motor-generator 54A so as to charge the electricity storage device 54C with electric power generated by the motor-generator 54A. If the air-conditioner load is high, the engine 50 is operated in order to drive the air-conditioner compressor.

If the third stop condition is not met, the engine 50 is operated for the following reasons. That is, if during an operation of the engine 50, there occurs a failure that would impede the starting of fuel injection by the ignition device 52, that is, such a failure that the stopping of the engine 50 is not preferable, or if there occurs a failure that would impede the starting of ignition control by the ignition device 52, that is, such a failure that the stopping of the engine 50 is not preferable, stopping the engine 50 will incur the possibility of failing to restart the engine 50 when an attempt is made to restart the engine 50 after the overall stop condition has been removed.

If the inverter 78 and the motor-generator 54A fail, it is impossible to drive the air-conditioner compressor 201 by motive power from the motor-generator 54A if the engine 50 is stopped. If there is a failure in the circuit for communications among various electronic control devices that form the electronic control unit (ECU) 60, it may become impossible to restart the engine 50 after stopping the engine 50, or if the engine 50 could be restarted, it may be impossible to control the output from the engine 50 in a desired state. If there is a failure in various sensors and switches for detecting the overall stop condition, the accuracy of various signals used to rotate and stop the engine 50 deteriorates. Therefore, it is not preferable to stop the engine 50 based on such signals.

If the fourth stop condition is not met, the engine 50 is operated for the following reasons. That is, if the brake device 74A has a failure when the engine 50 is to be stopped, the aforementioned "hill hold control" cannot be performed. If the system for performing the aforementioned "lock control" has a failure, for example, if a friction engagement device or a valve of the hydraulic control device 58 has a failure, it is impossible to perform the "lock control". If the startup device 55 has a failure, it become impossible to restart the engine 50 after stopping the engine 50. If an electronic control valve of the intake device 55A has a failure, stopping the engine 50 would incur the possibility of failing to attain a desired amount of intake air when the engine 50 is restarted after it has been stopped.

Therefore, if the negative determination is made in step S1, the engine 50 is operated, and it is determined whether the cause of the negative determination is that the only second stop condition is not met (step S2). If the negative determination is made in step S2, that is, if the engine 50 is rotating due to the first stop condition, the third stop condition or the fourth stop condition, this control routine is ended.

If the affirmative determination is made in step S2, the vehicle is in the stopped state with the lockup clutch 11 released. Therefore, if the affirmative determination is made in step S2, it is determined whether a condition for starting a "neutral control", that is, a control for reducing the load on the engine 50, is met (step S3).

The neutral control condition is met if it is detected "that the vehicle is stopped", "that the D position is selected by the shift device 57", and "that the brake pedal 67A is depressed". If the affirmative determination is made in step S3, the "neutral control" is executed (step S4), and the control routine is ended. The "neutral control" means that the power transfer passage between the input shaft 14 and the output shaft 32 is controlled to a "state where power transfer is impossible". As a method of executing the "neutral control", it is possible to use a method in which the shift solenoids 72 are controlled, and a method in which the manual valve 59 is controlled.

The method in which the shift solenoids 72 are controlled will be described below. If any one of the forward positions is selected, the first clutch C1 is engaged regardless of the speed stage. Therefore, the shift solenoids 72 are controlled so as to operate the shift valves 71 so that the oil pressure in the oil pressure chamber 70 of the first clutch C1 is reduced. Thus, by releasing the first clutch C1 or causing the first clutch C1 to slip, the power transfer passage between the input shaft 14 and the output shaft 32 enters a neutral state.

The method in which the manual valve 59 is controlled will be described below. If the manual valve 59 is operated by the actuator 79 and the manual valve 59 is controlled so as to be in the same state as it is when the shift position of the shift device 57 is in the N position, without the shift position being in N position, the output port of the manual valve 59 is closed. This output port is a port for supplying the oil to the oil pressure chamber 70 of the first clutch C1. Therefore, as in the aforementioned case, the first clutch C1 is released, and the power transfer passage between the input shaft 14 and the output shaft 32 enters the neutral state. Thus, if the "neutral control" is executed in the case where the vehicle is stopped and where the lockup clutch 11 is released and therefore slip occurs between the pump impellor 7 and the turbine runner 9 of the torque converter 2, the resistance that hinders rotation of the turbine runner 9 is reduced. That is, the oil agitating resistance caused by relative rotation of the pump impellor 7 and the turbine runner 9, that is, dragging torque, is reduced. Therefore, the load on the engine 50 can be reduced, and the fuel consumption can be reduced.

In step S4 in the flowchart of FIG. 1, the load on the engine 50 may also be reduced by executing a control other than the "neutral control". For example, in step S4, it is possible to execute a control of reducing the torque capacity of the torque converter 2 by adjusting the angle of the blades of the pump impellor 7 and the turbine runner 9 of the torque converter 2. Furthermore, in step S4, it is also possible to reduce the engaging pressure of the clutch 54B, that is, the torque capacity thereof, in order to reduce the load on the engine 50. That is, even if the amount of charge of the electricity storage device 54C is equal to or greater than a predetermined value and the regenerative power generation of the motor-generator 54A is not being performed, a portion of the motive power of the engine 50 is consumed as a motive power for idling the motor-generator 54A provided that the clutch 54B is completely engaged. Therefore, in step S4, it is also possible to reduce the load on the engine 50 by executing a control of releasing the clutch 54B or causing the clutch 54B to slip.

In step S1, whether the third stop condition is met, that is, whether there is an abnormality in the various sensors and switches, is determined by the overall control unit of the electronic control unit 60. Therefore, regardless of which one of the controls is performed, it is a precondition that the overall control unit of the electronic control unit 60 functions normally.

According to the example of the control illustrated in FIG. 1, at least one of the "neutral control", the control of reducing the torque capacity of the torque converter 2 and the control of reducing the torque capacity of the clutch 54B is performed if the engine 50 is to be operated because at least the second stop condition is not met of the overall stop request, i.e., a request for stopping the engine 50 based on a condition other than the state of operation of the ignition key 63A. Therefore, the load on the engine 50 can be reduced, and the amount of fuel consumed by the engine 50 can be reduced. It should be noted herein that the execution of the "neutral control" in step S4 after the determination in step 53 is positive does not give the driver a sense of discomfort since the first stop condition being met means that the driver intends to stop the vehicle. When the determination in step 53 is negative, the control routine ends as shown in FIG. 1.

The cooling water temperature of the cooling device 53, the pressure in the negative pressure chamber of the brake device 74A, and the amount of charge of the electricity storage device 54C may be detected, and the learning state of the air-fuel ratio of the engine 50 and the load state of the air-conditioner may be determined. On the basis of the results of detection and determination, the ECU 60 may determine whether the cooling water temperature is equal to or greater than a predetermined temperature, whether the pressure in the negative pressure chamber of the brake device 74A is at the level that allows the reduction in the operating force needed to depress the brake pedal 67A, whether the control of learning the air-fuel ratio of the engine 50 has been completed, whether the amount of charge of the electricity storage device 54C is equal to or greater than the predetermined value, and whether the air-conditioner load is equal to or less than the predetermined value. The ECU 60 may determine whether the second stop condition is met in the step S1 and whether the second stop condition is not met in the step S2 on the basis of the result of these determination. In this case, if all the events are met, the ECU 60 determines that the second stop condition is met. If at least one of the above events is not met, the ECU 60 determines the second stop condition is not met.

Further, as another example, the cooling water temperature of the cooling device 53, the pressure in the negative pressure chamber of the brake device 74A, and the amount of charge of the electricity storage device 54C are detected, and the learning state of the air-fuel ratio of the engine 50 and the load state of the air-conditioner are determined. On the basis of the results of detection and determination, the ECU 60 may determine whether the cooling water temperature is lower than a predetermined temperature, whether the pressure in the negative pressure chamber of the brake device 74A is not at a level that allows a reduction in the operating force needed to depress the brake pedal 67A, whether a control of learning the air-fuel ratio of the engine 50 has not been completed, whether the amount of charge of the electricity storage device 54C is lower than a predetermined value, and whether the air-conditioner load is greater than a predetermined value. The ECU 60 may determine whether the second stop condition is met in the step S1 and whether the second stop condition is not met in the step S2 on the basis of the result of these determination. In this case, if the above any events are not met, the ECU 60 determines that the second stop condition is met. If at least one of the above events is met, the ECU 60 determines the second stop condition is not met.

Further, the amount of charge may be replaced by another parameter that indicates a state of the charge (e.g. a rate of charge of the electricity storage device 54C). Furthermore, in the cases where the amount of charge of the electricity storage device 54C is lower than a predetermined value and where a request to operate the engine 50 is generated from an accessory, e.g., the air-conditioner compressor 201, that is driven by power from the engine 50, it is not desirable to reduce the engaging pressure of the clutch 54B.

It is possible to modify the foregoing embodiment so as to execute the neutral control "when the system involved in the control of rotating and stopping the engine 50 is not in a normal state", and "when the system involved in the control of rotating and stopping the engine 50 is in a failed state or an abnormal state". In these cases, the routine of FIG. 1 is modified.

First, the case will be described where the neutral control is executed when the system involved in the control of rotating and stopping the engine 50 is not in a normal state. It is detected whether the system involved in the control of rotating and stopping the engine 50 is in a normal state, and the ECU 60 determines whether the third stop condition is met in the step S1 and whether the third stop condition is not met in the step S2 on the basis of the result of the detection. In this case, if it is detected that the system is in the normal state, the ECU 60 determines that the third stop condition is met. If it is detected that the system is not in the normal state, the ECU 60 determines the third stop condition is not met.

Next, the case will be described where the neutral control is executed, when the system involved in the control of rotating and stopping the engine 50 is in a failed state or an abnormal state. It is detected whether the system involved in the control of rotating and stopping the engine 50 is in a failed state or an abnormal state, and the ECU 60 determines whether the third stop condition is met in the step S1 and whether the third stop condition is not met in the step S2 on the basis of the result of the detection. In this case, if it is detected that the system is not in the failed state or the abnormal state, the ECU 60 determines that the third stop condition is met. If it is detected that the system is in the failed state or the abnormal state, the ECU 60 determines the third stop condition is not met.

The invention may be applied to a hybrid vehicle in which a request to stop the drive power source is made based on a reduction in the degree of an acceleration request for the vehicle. If the request to stop the drive power source is made output based on a reduction in the degree of a request to accelerate the vehicle (e.g. a change of vehicle running state from "a state in which the vehicle runs at a low speed while accelerating" to "a state in which the vehicle runs at a constant, high speed"), it is determined whether there is no request for driving the vehicle by utilizing driving force from the engine and there is a request for operating the engine from a system other than an economy run system. If the determination is affirmative, the engine is not stopped and the above described "neutral control" is executed. Thus, if the request to stop the drive power source is output based on the reduction in the degree of the acceleration request for the vehicle, the driver does not wish that the driving force is transmitted from the drive power source. Therefore, the drivability will not deteriorate even if the driven device is controlled so as to reduce the load on the drive power source (to reduce the driving force that is transferred to the driven device). The second and fourth stop conditions may be used for determining whether there is no request for driving the vehicle by utilizing driving force from the engine and there is a request for operating the engine from a system other than an economy run system.

As is clear from the above description, the engine 50 functions as a drive power source. The transmission 4 and the electric device 54 function as driven devices. The transmission 4 functions as a power transfer device. The front cover 8, the input shaft 14 and the output shaft 32 function as rotating members. Steps S1 to S4 are performed by the ECU 60 in order to reduce the load. A failure or abnormality in the ignition device 52, the fuel injection device 51, etc. corresponds to a state of a system that controls the rotating and stopping of the drive power source. The ignition device 52, the fuel injection device 51, etc. function to control the rotating of the engine 50 (including the startup and the autonomous operation thereof) and the stopping of the engine 50. Furthermore, a failure or abnormality in the signal generating devices, such as the various sensors and switches and the like, which occurs in a stage prior to the direct control of the rotating and stopping of the engine 50, also corresponds to "a state of a system that controls the rotating and stopping of the drive power source." The control of the engine 50, including the startup, the operation, the stoppage, etc., corresponds to "a control of the rotating and stopping of the drive power source." The overall stop condition corresponds to a predetermined condition.

Furthermore, in the invention, a state where the drive power source is not allowed to be stopped includes a state where there is no request for driving the vehicle by utilizing driving force from the drive power source and there is a request for operating the drive power source from a system other than an economy run system, and a state where the system that controls the rotating and stopping of the drive power source is in at least one of a failed state and an abnormal state.

In the illustrated embodiment, the controllers are implemented with general purpose processors. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicle control apparatus comprising:
   a driven device that is driven by power from a drive power source;
   a system that controls rotating and stopping of the drive power source based on a predetermined condition including whether the system is in a state where the system is not allowed to stop the drive power source, wherein the state where the system is not allowed to stop the drive power source includes a state where there is no request for driving the vehicle by utilizing driving force from the drive power source and there is a request for operating the drive power source from a system other than an economy run system; and
   a controller that, while it is determined that the system is in a state where the system is not allowed to stop the drive power source, determines whether the driven device should be controlled so as to reduce a load on the drive power source based on whether a driver of the vehicle is intending to stop the vehicle.

2. A vehicle control apparatus according to claim 1, wherein the driven device includes a power transfer device that transfers the power from the drive power source to a wheel of the vehicle.

3. A vehicle control apparatus according to claim 2, wherein the controller reduces the load on the drive power source by controlling a torque capacity between rotating members of the power transfer device.

4. A vehicle control apparatus according to claim 3, wherein:
   the rotating members include a first rotating member to which the power is input from the drive power source, and a second rotating member that transfers the power from the first rotating member to the wheel, and
   the power transfer device includes a fluidic torque transfer coupling that thrnsfers a torque from the first rotating member to the second rotating member using a fluid.

5. A vehicle control apparatus according to claim 3, wherein:
   the rotating members include a first rotating member to which the power is input from the drive power source, and a second rotating member that transfers the power from the first rotating member to the wheel,
   the power transfer device transfers a torque from the first rotating member to the second rotating member using a friction force, and
   the controller reduces the load on the drive power source by controlling the friction force between the first rotating member and the second rotating member.

6. A vehicle control apparatus according to claim 1, wherein the state where the system is not allowed to stop the drive power source also includes at least one of a failed state of the system and an abnormal state of the system.

7. A vehicle control apparatus according to claim 1, wherein the state where the system is not allowed to stop the drive power source includes a state where there is no request for driving the vehicle by utilizing driving force from the drive power source and there is a request for operating the drive power source from a system other than an economy run system.

8. A vehicle control apparatus according to claim 1, wherein the driven device has an accessory that does not transfer the power from the drive power source to a wheel of the vehicle.

9. A vehicle control apparatus according to claim 8, wherein the controller determines whether there is a drive request for the drive power source from the accessory, and the state where there is no request for driving the vehicle by utilizing driving force from the drive power source and there is the request for operating the drive power source from the system other than the economy run system includes a state where the drive request for the drive power source from the accessory is present.

10. A vehicle control method for a vehicle having a drive power source, a driven device that is driven by power transferred from the drive power source, and a system that selectively runs and stops the drive power source, comprising:
    determining whether the system is in a state where the system is not allowed to stop the drive power source, wherein the state where the system is not allowed to stop the drive power source includes a state where there is no request for driving the vehicle by utilizing driving force from the drive power source and there is a request for operating the drive power source from a system other than an economy run system; and
    while it is determined that the system is in the state where the system is not allowed to stop the drive power source, determining whether the driven device should be controlled so as to reduce a load on the drive power source based on whether a driver of the vehicle is intending to stop the vehicle.

11. A vehicle control method according to claim 10 wherein:
    the driven device includes a power transfer device that transfers the power from the drive power source to a wheel, and
    the load on the drive power source is reduced by controlling a torque capacity between rotating members of the power transfer device.

12. A vehicle control method according to claim 11, wherein:
    the rotating members include a first rotating member to which the power is input from the drive power source, and a second rotating member that transfers the power from the first rotating member to the wheel, and
    the power transfer device transfers a torque from the first rotating member to the second rotating member using a fluid.

13. A vehicle control method according to claim 11, wherein:
    the rotating members include a first rotating member to which the power is input from the drive power source, and a second rotating member that transfers the power from the first rotating member to the wheel,
    the power transfer device transfers a torque from the first rotating member to the second rotating member using a friction force, and
    the load on the drive power source is reduced by controlling the friction force between the first rotating member and the second rotating member.

14. A vehicle control method according to claim 10, wherein the state where the drive power source is not allowed to be stopped also includes at least one of a failed state of the system and an abnormal state of the system.

15. A vehicle control method according to claim 10, wherein:
    the driven device has an accessory that does not transfer the power from the drive power source to a wheel of the vehicle, the vehicle control method further comprises determining whether there is a drive request for the drive power source from the accessory, and the state where there is no request for driving the vehicle by utilizing driving force from the drive power source and there is the request for operating the drive power source from the system other than the economy run system includes a state where the drive request for the drive power source from the accessory is present.

16. A vehicle control apparatus according to claim 1, wherein:

the system that controls rotating and stopping of the drive power source includes at least one of a flael injection device that supplies a fuel to the drive power source to restart the drive power source, an ignition device that ignites fuel-air mixture to restart the drive power source, a communication circuit of an electronic control unit for controlling restart of the drive power source, an inverter coupled to the drive power source and a motor-generator coupled to the drive power source; and the state where the system is not allowed to stop the drive power source also includes at least one of a failed state and an abnormal state of the at least one of the fuel injection device, the ignition device, the communication circuit, the inverter and the motor-generato.

17. A vehicle control method according to claim 10, wherein the system that selectively runs and stops the drive power source ead includes at least one of a fuel injection device that supplies a fuel to the drive power source to restart the drive power source, an ignition device that ignites fuel-air mixture to restart the drive power source, a communication circuit of an electronic control unit for controlling restart of the drive power source, an inverter coupled to the drive power source and a motor-generator coupled to the drive power source, the determining step also includes determining whether the at least one of the fuel injection device, the ignition device, the communication circuit, the inverter and the motor-generator is in a state where the drive power source is not allowed to be stopped; and the controlling step also includes controlling the driven source so as to reduce ethe load on the drive power source if it is determined that the at least one of the fuel injection device, the ignition device, the communication circuit, the inverter and the motor-generator is in the state where the drive power source is not allowed to be stopped.

* * * * *